(12) United States Patent
Kawai

(10) Patent No.: US 7,154,198 B2
(45) Date of Patent: Dec. 26, 2006

(54) LINEAR MOTOR

(75) Inventor: Yoichi Kawai, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/242,810

(22) Filed: Oct. 4, 2005

(65) Prior Publication Data

US 2006/0076839 A1 Apr. 13, 2006

(30) Foreign Application Priority Data

Oct. 7, 2004 (JP) ............................. 2004-294998

(51) Int. Cl.
*H02K 41/00* (2006.01)

(52) U.S. Cl. ..................... 310/12; 310/13; 310/15; 310/14; 310/23; 310/36

(58) Field of Classification Search .............. 310/12, 310/13, 15, 14, 23, 36
See application file for complete search history.

(56) References Cited

U.S. PATENT DOCUMENTS

| | | | | |
|---|---|---|---|---|
| 5,107,157 | A * | 4/1992 | Ito ............................... | 310/12 |
| 5,225,725 | A * | 7/1993 | Shiraki et al. ................. | 310/12 |
| 5,229,670 | A * | 7/1993 | Kagawa ......................... | 310/12 |
| 5,801,462 | A * | 9/1998 | Yagoto et al. .................. | 310/12 |
| 6,025,659 | A * | 2/2000 | Nashiki ......................... | 310/12 |
| 6,236,124 | B1 * | 5/2001 | Sekiyama et al. ............. | 310/12 |
| 6,452,292 | B1 * | 9/2002 | Binnard ......................... | 310/12 |
| 6,828,699 | B1 * | 12/2004 | Baccini ......................... | 310/12 |

FOREIGN PATENT DOCUMENTS

| | | |
|---|---|---|
| JP | 2002101636 | 4/2002 |
| JP | 2002238241 | 8/2002 |

OTHER PUBLICATIONS

"Component Development and VE for Ultra Precise Processing Machine"; Kazushi Kawazu; Japan Scoiety for Precision Engineering, Technical Committee of Ultra Precision Positioning; Otsuka Laboratory in Mechanical Engineering Department of Shizuika Institute fo Science and Technology.

* cited by examiner

*Primary Examiner*—Darren Schuberg
*Assistant Examiner*—Iraj A. Mohandesi
(74) *Attorney, Agent, or Firm*—Gauthier & Connors LLP

(57) ABSTRACT

In a linear motor having permanent magnets placed on a slider, the slider has slider blocks disposed in such a manner that relative positions between front ends of the slider blocks in a slider moving direction and salient poles of two stators opposing the slider blocks is shifted by approximately 130 to 230 electrical degrees. Because the positions of the frond ends of the slider blocks in the slider moving direction relative to the stator salient poles of SIDE-A are shifted from those of SIDE-B by P/2 corresponding to 180 electrical degrees, thrust ripples occurring on SIDE-A and SIDE-B have a relationship such that they are displaced by P/2. As a result, the thrust ripples of SIDE-A and SIDE-B are canceled, thereby reducing a thrust ripple with P/3 periodicity.

4 Claims, 5 Drawing Sheets

LINEAR MOTOR

CROSS-REFERENCE TO RELATED APPLICATION

The entire disclosure of Japanese Patent Application No. 2004-294998 including the specification, claims, drawings, and abstract is incorporated herein by reference.

BACKGROUND OF THE INVENTION

1. Field of the Invention

The present invention relates to a linear motor used in industrial machinery, such as a machine tool.

2. Description of the Related Art

Conventionally, linear motors have been used in industrial machinery, such as machine tools, as means for realizing speed enhancement and a high level of precision. One such linear motors is disclosed in Japanese Patent Laid-Open Publication No. 2002-238241, in which costly permanent magnets are placed on a slider; in particular, in a long-stroke machine, thereby minimizing use of the permanent magnets to thereby reduce motor cost.

FIG. 2A shows the conventional linear motor disclosed in the above Japanese Patent Laid-Open Publication No. 2002-238241.

FIG. 2B shows magnetized directions of permanent magnets in the conventional linear motor, and FIG. 3 shows connection of AC windings in the conventional linear motor. Specifically, in FIG. 2A, a stator 12 fixed, for example, on a bed of a machine tool is formed by laminating flat rolled magnetic steel sheets, and has stator salient poles 10 formed on a surface thereof at a pitch P. Further, a slider 11 fixed, for example, on a table of the machine tool is movably supported by a rolling guide or the like provided between the bed and the table of the machine tool along an X-axis direction depicted in FIG. 2A. Similar to the stator 12, the slider 11 is formed by laminating, for example, flat rolled magnetic steel sheets, and has U, V, and W phase teeth 13, 15, and 14, shifted from each other along the X-axis direction by P/3 corresponding to an electrical angle of 120 degrees. U, V, and W phase AC windings 16, 18, and 17 are wound around the teeth. A plurality of permanent magnets 19 are disposed in alternating sequence of N, S, N, S, . . . on the surface of the slider 11. Taking S and N as one pair, as shown in FIG. 2B, each of the teeth 13, 14, and 15 has three pairs of the permanent magnets 19 arranged thereon at the pitch P. Reference numeral 22 represents magnetic flux in a magnetic yoke 20 of the slider and a magnetic yoke 21 of the stator when a current is supplied to the AC windings 16, 17, and 18 in a direction from U to V and W. The AC windings 16, 18, and 17 are connected so as to establish a star connection of U, V, and W phases.

Here, when a current is applied to the AC windings 16, 17, and 18, the teeth 13, 14, and 15 constituting the three phases are excited in a positive or negative direction along a Y-axis direction depicted in FIG. 2A. At this time, magnetic flux of one portion of the permanent magnets 19 having a magnetic direction identical to the excitation direction of the AC windings 16, 17, and 18 is enhanced, while magnetic flux of the other portion of the permanent magnets 19 having a magnetic direction opposite the excitation direction is suppressed. As a result, the teeth 13, 14, and 15 are excited to exhibit either N or S polarity, thereby forming a large North or South magnetic pole. The magnetic flux 22 passing through the teeth 13, 14, and 15 and the stator forms a closed loop as shown in FIG. 2A. Therefore, the force of magnetic attraction in accordance with a position of the slider 11 in relation to the stator 12 is generated, thereby producing a thrust force of the slider 11.

A flow of the magnetic flux 22 will be described in detail below. When a current is applied in a direction from the U phase towards the V and W phases; in other words, when a current is fed through the AC winding 16 in an illustrated winding direction and fed through the AC windings 17 and 18 in a direction opposite the illustrated winding direction, the tooth 13 becomes a South pole, whereas the teeth 14 and 15 become North poles in FIG. 2A. Further, the magnetic flux 22 forms a magnetic path flowing from the tooth 13 to the teeth 14 and 15 and then returning through the stator 12 to the tooth 13. As a result, the force of magnetic attraction acts on the slider 11 in the X-axis direction, which produces the thrust force of the slider 11.

The conventional linear motor shown in FIGS. 2A and 2B is characterized by realizing cost reduction of the linear motor by disposing costly permanent magnets on the slider to thereby decrease use of the permanent magnets 19; in particular, in a case where the stroke is long. In addition, the linear motor has a characteristic such that a plurality of magnetic poles composed of the teeth 13, 14, and 15 and the plurality of permanent magnets 19 are excited by means of a single winding, thereby allowing the winding to become shorter, and, in turn, yielding an effect of reducing a loss due to electrical resistance occurring when currents pass through the winding; i.e., so-called copper loss, thereby realizing improved efficiency.

It should be noted that, as a method of connecting the AC windings, a delta connection may be adopted instead of the star connection illustrated in FIG. 3.

In a machine tool in which tables are moved via a feed rod actuated by a linear motor, an essential factor is that the linear motor should drive the tables with a constant thrust force to produce a smooth machined surface. To meet this need, thrust ripples of the linear motor must be minimized. However, the conventional linear motor shown in FIGS. 2A and 2B suffers problematic occurrence of a relatively large thrust ripple resulting from a positional relationship between front ends of the teeth 13, 14, and 15 in a moving direction thereof provided to the slider 11 and the stator salient poles 10 attached to the stator 12.

Because the teeth 13, 14, and 15 are disposed to be shifted by P/3 corresponding to 120 electrical degrees, movement of the slider 11 relative to the stator 12 causes one of the front ends of the teeth 13, 14, and 15 to pass through an edge of one of the stator salient poles 10 on the same side at an interval of P/3, bringing about a change in permeance. From this change in permeance, periodicity of occurrence of the thrust ripple is determined as P/3.

FIG. 4 shows another conventional linear motor disclosed in Japanese Patent Laid-Open Publication No. 2002-101636 adopting a structure for reducing the ripple having the P/3 periodicity.

In FIG. 4, an armature A has a structure similar to that of the slider 11 in the conventional linear motor shown in FIG. 2A, and an armature B is identical with the armature A except for the permanent magnets disposed on the U, V, and W phase teeth arranged in the order of N, S, N, . . . ; i.e., arranged so as to be opposite in direction of magnetic pole to the armature A. The armatures A and B are fixed on a clamping plate 23 in such a manner that positions of the armatures A and B relative to the stator salient poles are shifted by P/2; i.e., shifted by 180 degrees in electrical angle.

FIG. 5 shows a thrust ripple of the conventional linear motor of FIG. 4 configured as described above. Because the armatures A and B are displaced by P/2 corresponding to 180 electrical degrees, the trust ripple with P/3 periodicity occurring in the armature A and that occurring in the armature B have a relationship such that the thrust ripples are out of phase with each other by 180 degrees, but of the same amplitude. Accordingly, the thrust ripples with P/3 periodicity cancel each other. As can be seen from the relationship between the amount of displacement of the armatures A and B and the thrust ripple shown in FIG. 6, the thrust ripple can be reduced to one-fifth or less its original level, so long as the displacement is 160–200 electrical degrees. For this reason, the armatures A and B are not necessarily displaced 180 electrical degrees with a high degree of precision, and a sufficient effect of reducing thrust ripple can be obtained by the displacement within the range of 160 to 200 electrical degrees.

Such a conventional linear motor as described above, however, has a problem that remains to be solved, which will be described below.

When a linear motor is used to drive a feed rod for a table in a machine tool, for example, the table should be driven smoothly with a uniform thrust force to produce a smooth machined surface; therefore, the thrust ripple occurring with P/3 periodicity must be minimized. Because the linear motor is embedded in a machine and used therein in general, the size of the linear motor is desirably reduced to the extent possible. However, because the conventional linear motor disclosed in Japanese Patent Laid-Open Patent No. 2002-101636 is constructed using the two armatures A and B, the length of the slider becomes longer in its moving direction, which poses difficulty in compact incorporation of the linear motor into the machine and causes extension, by the length of one slider, of the length of the stator, which is designed on the basis of the the stroke of a moving body+the length of the slider. Further, third and fourth embodiments described in the above patent document teach a layout in which the armatures A and B are displaced by P/2 corresponding to an electrical angle of 180 degrees and arranged on the slider in parallel with the slider moving direction. In this layout, the size of the slider is increased in a direction perpendicular to the slider moving direction, which also makes it difficult to install the linear motor in confined spaces of the machine.

In addition, another demand for a linear motor is weight reduction. In a machine tool, for example, a table driven by a liner motor is operated under increased acceleration and deceleration for the purpose of reducing machining time, and this raises a demand for further weight reduction. In the conventional linear motor, a force of magnetic attraction, which is several to ten times greater than the thrust force, is generated between the slider and the stator, along a direction perpendicular to the slider moving direction. The force of magnetic attraction along the direction perpendicular to the slider moving direction problematically deforms a structure for movably supporting the linear motor and/or a rolling guide, which results in lowered accuracy of machining a workpiece.

SUMMARY OF THE INVENTION

In order to solve the aforementioned problems, the present invention advantageously provides a linear motor comprising two stators having a plurality of salient poles arranged at a predetermined interval on surfaces opposing each other, and extending in parallel; and a slider having three slider blocks which form magnetic poles of three different phases by action of three-phase AC windings, and capable of moving along an extension direction of the two stators. In the linear motor, each of the slider blocks has two permanent magnet groups each consisting of a plurality of permanent magnets disposed on a surface of the respective slider block and opposing the respective stator in an array of alternating north and south polarities along a slider moving direction. The two permanent magnet groups are placed so as to generate driving forces acting in the same direction between the resilient poles of the two stators and the slider blocks along the slider moving direction. Further, in the linear motor, a coil wound between the two permanent magnet groups is disposed to simultaneously generate magnetic flux on opposite surfaces of each of the slider blocks facing the two stators. In the slider blocks, positions of front edges in the slider moving direction relative to the salient poles of the stators opposing the respective slider blocks are shifted from each other by approximately 130 to 230 electrical degrees, preferably by 180 electrical degrees.

According to the present invention, thrust ripples having P/3 periodicity cancel each other, to thereby drive the slider in a smooth manner. In addition to elimination of a magnetic yoke of the slider, magnetic flux can be simultaneously generated on two opposite surfaces of the slider both facing the stators, thereby enabling reduction in size of the slider, and in turn facilitating incorporation into a machine. Further, the weight of the slider can be reduced, to thereby enable operation under increased acceleration and deceleration. Because the force of magnetic attraction acting between the slider and the stator along the direction perpendicular to the slider moving direction is canceled, deformation of the structure which movably supports the linear motor and the rolling guide can be prevented.

BRIEF DESCRIPTION OF THE DRAWINGS

A preferred embodiment of the present invention will be described in detail by reference to the drawings, wherein.

DESCRIPTION OF THE PREFERRED EMBODIMENT

By reference to the drawings, an embodiment of the present invention will be described below.

Figure 1A:
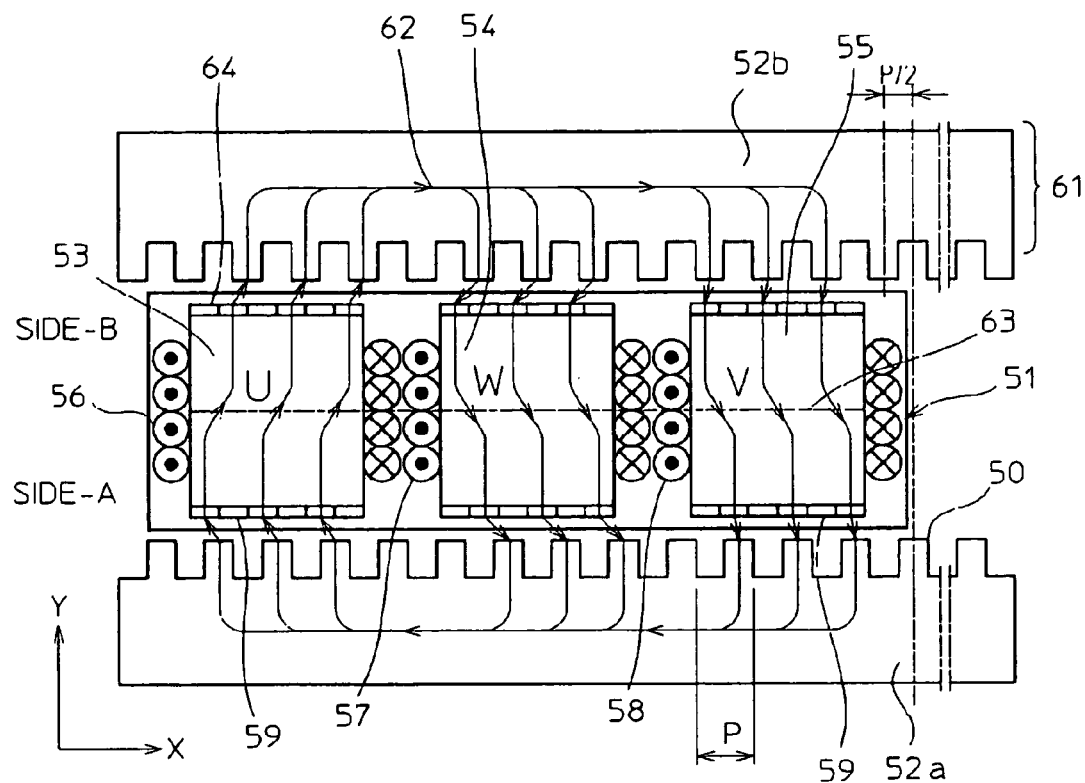
FIG. 1A shows a schematic configuration of a linear motor according to an embodiment of the present invention.
Figure 1B:
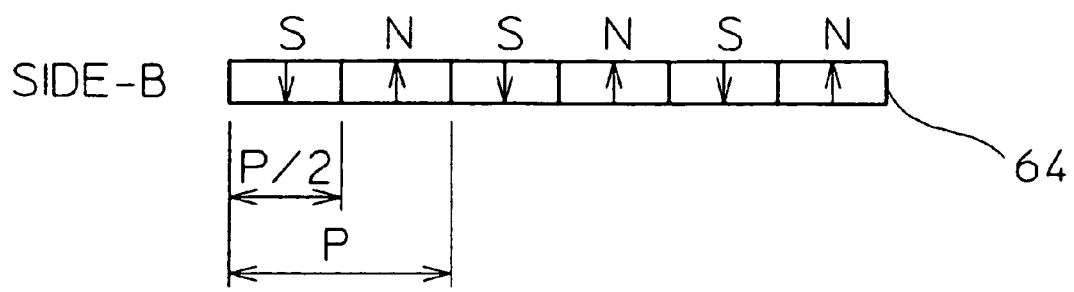
FIG. 1B is a diagram showing a layout of permanent magnets in the linear motor according to the embodiment of the present invention.
Figure 1C:
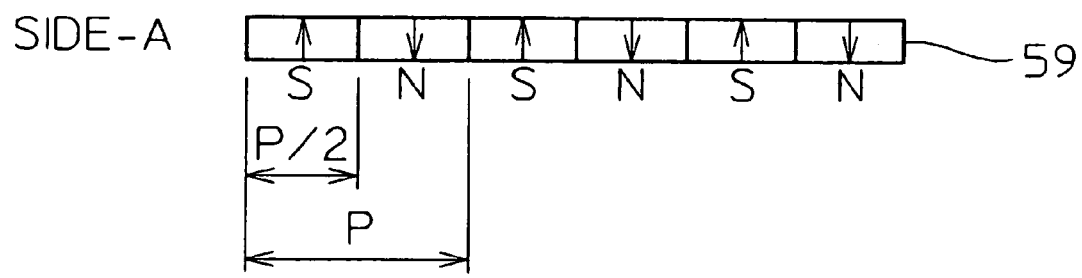
FIG. 1C is a diagram showing another layout of permanent magnets in the linear motor according to the embodiment of the present invention.
Figure 3:
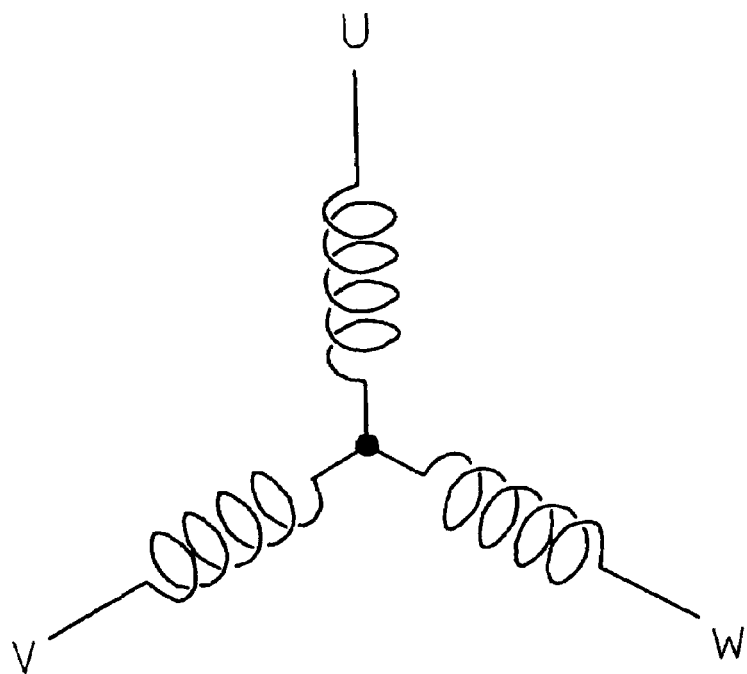
FIG. 3 schematically illustrates a connection form of windings in the linear motor according to the related art.
Figure 4:
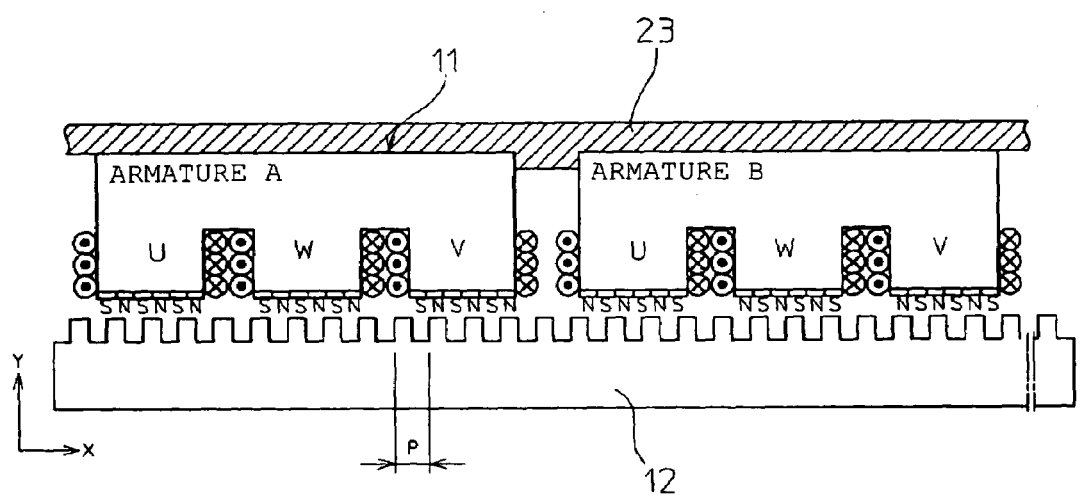
FIG. 4 shows another conventional linear motor having a structure for reducing a thrust ripple and including permanent magnets disposed on a slider.

FIG. 1A shows a linear motor according to an embodiment of the present invention. In FIG. 1A, stators 52a and 52b are fixed, for example, on a bed of a machine tool. The stators 52a and 52b are formed by laminating flat rolled magnetic steel sheets, or the like, and have salient poles 50 formed at a pitch P. Further, the stators 52a and 52b are displaced by P/2 corresponding to 180 electrical degrees with respect to each other in an X-axis direction illustrated in FIG. 1A. A slider 51 is provided between the bed and a table of the machine tool, for example, and supported movably along the X-axis direction of FIG. 1A by a rolling guide fixed on the table. In addition, the slider 51 has slider blocks 53, 55, and 54 of U, V, and W phases formed by laminating flat rolled magnetic steel sheets, or the like. The slider blocks 53, 54, and 55 are mutually displaced by 120 degrees along the X-direction; in other words, displaced from each other by P/3 corresponding to 120 electrical degrees in terms of a magnetic pole pitch P of the stators 52a and 52b. AC windings 56, 58, and 57 composed of three phases, U, V, and W, are wound around the stator blocks, and a plurality of permanent magnets 59 and 64 are disposed in an alternating sequence of S, N on respective surfaces of the slider blocks in the slider 51. More specifically, when one pair is defined as consisting of two adjacent permanent magnets, the S and N poles of which are located on a side which opposes the corresponding stator 52a or 52b as shown in FIGS. 1B and 1C, three pairs of the two permanent magnets are arranged at the pitch P on each of the slider blocks 53, 54, and 55. When a stator 52a side is defined as SIDE-A and a stator 52b side is defined as SIDE-B, the permanent magnets 59 of SIDE-A and the permanent magnets 64 of SIDE-B are disposed in such a manner that polarity directions, for example, viewed from the stator 52a position of SIDE-A, match those viewed from the stator 52b of SIDE-B, to thereby generate the force of magnetic attraction acting towards the same direction along a slider moving direction. Reference numeral 62 represents magnetic flux in a magnetic yoke 61 of the stator generated by applying currents to the AC windings 56, 57, and 58 in a direction from U to V and W. The AC windings 56, 58 and 57 are connected in such a manner that the U, V, and W phases are star-connected as shown in FIG. 3.

Here, when a current is applied to the AC windings 56, 57, and 58, the slider blocks of three phases are excited in either the positive direction or the negative direction of the Y axis. Among the plurality of permanent magnets 59 and 64, permanent magnets placed in magnetic orientation identical to the excitation direction of the AC windings are enhanced in magnetic flux, whereas the other permanent magnets placed in magnetic orientation opposite the excitation direction are reduced in magnetic flux. As a result, the surfaces opposing the stators are exited through the permanent magnets 59 and 64, thereby becoming either N or S poles. Accordingly, the magnetic flux 62 passing through the slider blocks 53, 54, and 55 and the stators as shown in FIG. 1A is formed, thereby generating the force of magnetic attraction acting in the same direction along the X axis in accordance with the positions of the slider 51 and the stators 52a and 52b.

The flow of the magnetic flux will be described in further detail below. By feeding a current in the directions from U towards V and W; more specifically, by passing a current through the AC winding 56 along a winding direction shown in FIG. 1A and through the AC windings 57 and 58 along a direction opposite the illustrated winding direction, the stator block 53 of FIG. 1A exhibits S polarity on the surface of SIDE-A and N polarity on the surface of SIDE-B, whereas the stator blocks 54 and 55 exhibit N polarity on the surface of SIDE-A and S polarity on the surface of SIDE-B. The magnetic flux 62 forms a magnetic path running from the slider block 53 via the stator 52b to the slider blocks 54 and 55 and then returning via the stator 52a to the slider block 53. Consequently, the force of magnetic attraction acts on the surfaces of SIDE-A and SIDE-B of the slider 51 in the same direction of the X axis, thereby yielding a thrust force.

Figure 5:
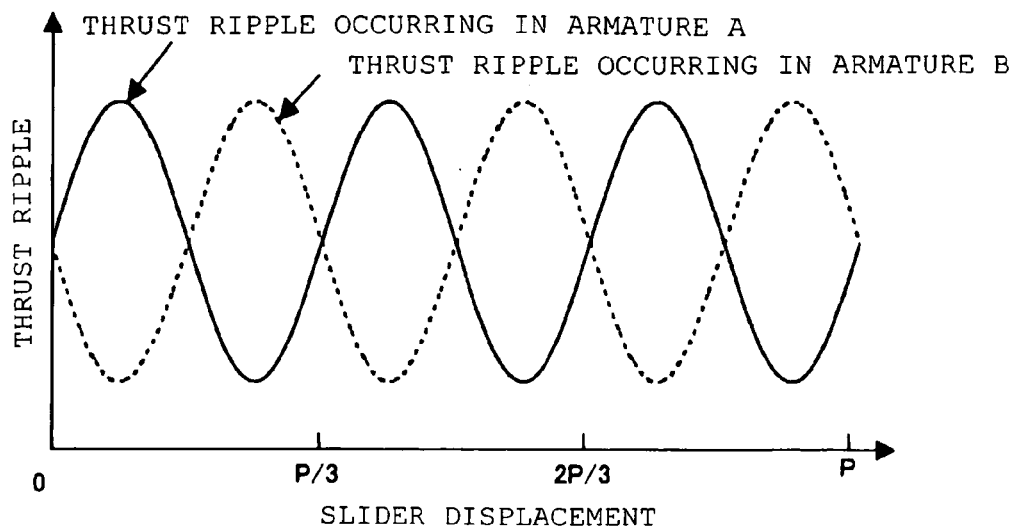
FIG. 5 is a drawing for explaining a principle for reducing the thrust ripple in the linear motor of FIG. 4.

A positional relationship between the front end in the slider block moving direction and the salient poles 50 of the stator is shifted along the X-axis direction with respect to SIDE-A and SIDE-B by P/2, corresponding to 180 electrical degrees. Accordingly, similar to the relationship between the thrust ripples generated by the armatures A and B shown in FIG. 5, thrust ripples occurring on SIDE-A and SIDE-B have a relationship such that they are displaced by P/2 with respect to each other. By this displacement, the thrust ripples occurring on the SIDE-A and the SIDE-B are synthesized, canceling a thrust ripple having P/3 periodicity.

Figure 2A:
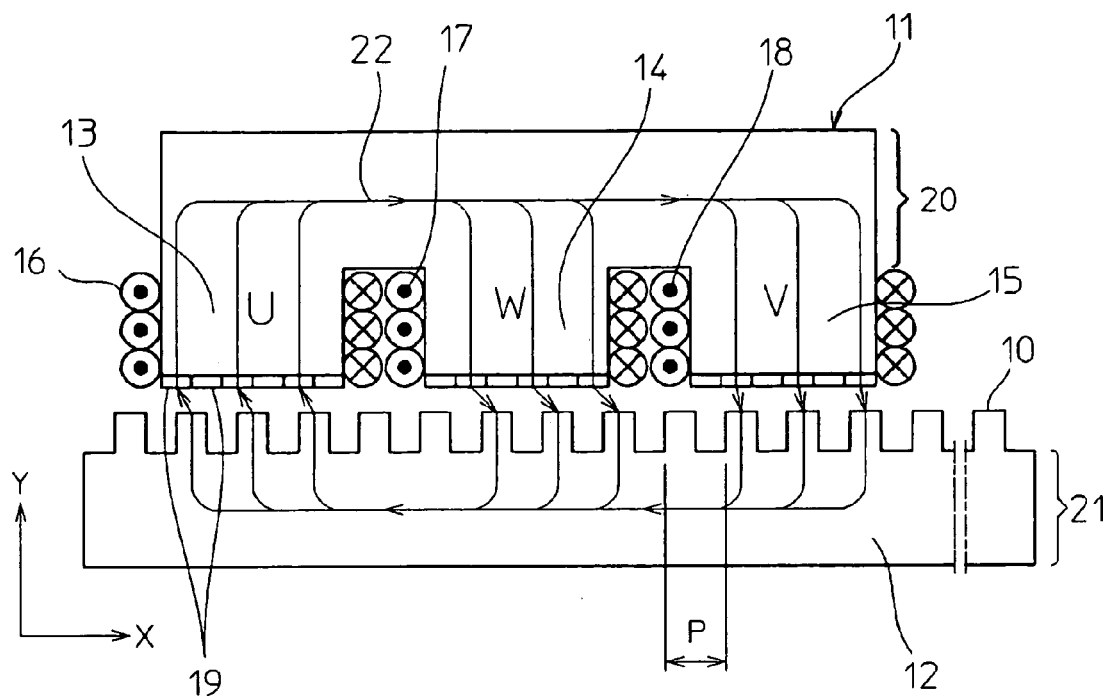
FIG. 2A shows a conventional linear motor in which permanent magnets are disposed on a slider according to the related art.
Figure 2B:
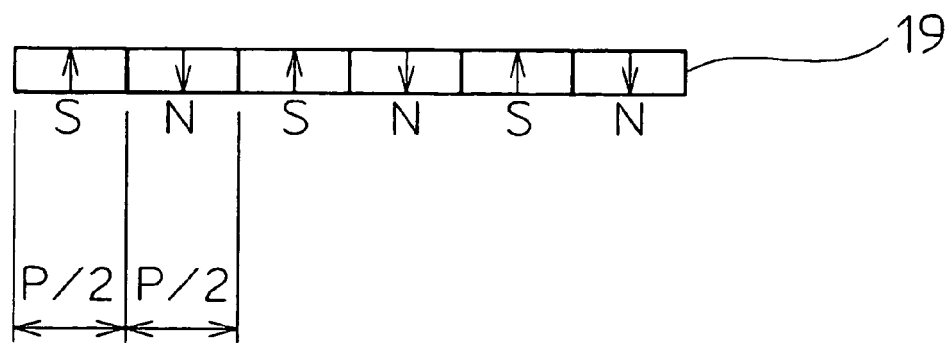
FIG. 2B shows a layout of the permanent magnet according to the related art.

In addition, both SIDE-A and SIDE-B surfaces of each of the slider blocks 53, 54, and 55 are configured to be excited using the same winding. In this configuration, the amount of winding is reduced to one-half that used in the conventional linear motor of FIGS. 2A and 2B, and the magnetic yoke 20 of the slider provided in the conventional linear motor is eliminated, thereby facilitating size and weight reduction of the slider 51. Therefore, the linear motor according to the present invention can be easily installed in a machine, and allows the machine in which the linear motor is installed to be operated under increased acceleration and deceleration. Because the force of magnetic attraction along the Y-axis direction occurring between the slider 51 and the stator 52a of SIDE-A and that occurring between the slider 51 and the stator 52b of SIDE-B are equal in magnitude and opposite in direction, the forces of magnetic attraction cancel each other, thereby preventing deformation of the structure for movably supporting the linear motor and the rolling guide.

Figure 6:
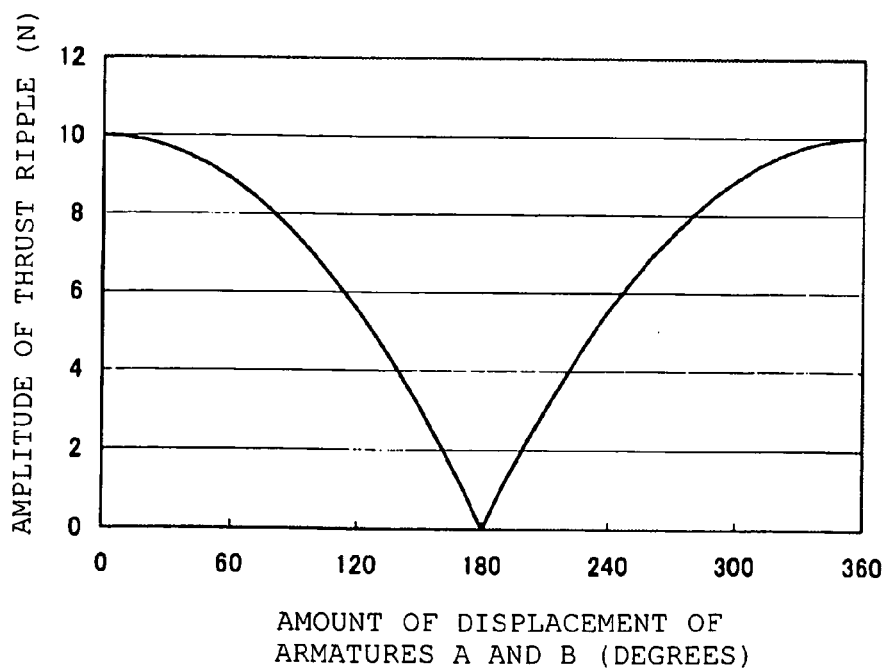
FIG. 6 shows a relationship between the amount of displacement of two armatures and the thrust ripple in the linear motor of FIG. 4.

Similar to the relationship between the amount of displacement of the armatures A and B and the thrust ripple shown in FIG. 6, a displacement of 130~230 electrical degrees is sufficient for achieving one-half reduction of the thrust ripple. Therefore, relative positions in the slider moving direction between the front ends of the slider blocks and the corresponding salient poles of the two stators opposing the slider blocks are not necessarily displaced by 180 electrical degrees with great precision; displacement of the relative positions within a range of 130 to 230 electrical degrees can provide a sufficient effect of reducing the thrust ripple.

Even when windings divided into two or more segments are used for reasons relating to manufacturing process, similar actions and effects can be obtained, so long as the winding directions of the windings wound around the slider blocks 53, 54, and 55 are the same.

Further, the pitch P of the permanent magnets on the slider 51 and the pitch of the salient poles of the stators 52a and 52b are not necessarily P/2. To cancel thrust ripples having periodicity other than the P/3 periodicity, for example, intervals between the plurality of the permanent magnets 59 and 64 on the slider blocks and/or intervals between the stator salient poles 50 may be nonuniform and other than P/2. In such a nonuniform arrangement, similar actions and effects can be obtained, so long as the plurality of the permanent magnets 59 of SIDE-A and the plurality of the permanent magnets 60 of SIDE-B disposed on the slider blocks 53, 54, and 55 are configured to have the same polarity when viewed from the stator of SIDE-A and when viewed from the stator of the SIDE-B for generating the forces of magnetic attraction acting in the same direction along the slider moving direction, and the stators 52a and 52b of SIDE-A and SIDE-B are shifted from each other by approximately 130~230 electrical degrees, preferably by 180 electrical degrees.

Although in the above embodiment the permanent magnets 59 and 60 are described as consisting of three pairs (a total of 6) of permanent magnets having S polarity on the surface opposing the stator and permanent magnets having N polarity on the surface opposing the stator, the number of the pairs is not limited to three, and any number of pairs of the permanent magnets can provide actions and effects similar to those of the present invention.

Further, the slider 51 according to the above-described embodiment may be increased in number so as to arrange a plurality of the sliders 51 displaced from each other by a pitch P corresponding to an electrical angle of 360 degrees. Also in this case, actions and effects similar to those of the present invention can be obtained.

What is claimed is:

1. A linear motor comprising:
   two stators having a plurality of salient poles arranged at a predetermined interval on surfaces opposing each other, and extending in parallel; and
   a slider having three slider blocks which form magnetic poles of three different phases by action of three-phase AC windings, and capable of moving along an extension direction of the two stators; wherein
   each of the slider blocks has two permanent magnet groups each consisting of a plurality of permanent magnets disposed on a surface of the corresponding slider block opposing the respective stator in an array of alternating north and south polarities along a slider moving direction,
   the two permanent magnet groups are placed so as to generate driving forces acting in the same direction between the resilient poles of the two stators and the slider blocks along the slider moving direction,
   a coil wound between the two permanent magnet groups is disposed to simultaneously generate magnetic flux on opposite surfaces of the slider blocks facing the two stators, and
   in each of the slider blocks, positions of front edges in the slider moving direction relative to the salient poles of the respective stators opposing the slider blocks are shifted from each other by approximately 130 to 230 electrical degrees.

2. A linear motor according to claim 1, wherein
   the two stators are displaced from each other by 180 electrical degrees along the slider moving direction.

3. A linear motor according to claim 1, wherein
   each of the slider blocks has two permanent magnet groups each consisting of a plurality of permanent magnets disposed on a surface of the corresponding slider block opposing the respective stator in an array of alternating north and south polarities in identical sequence along a slider moving direction, and
   the permanent magnets are disposed on opposite surfaces of each of the slider blocks in such a manner that polarities of the permanent magnets facing one of the stators are identical to those facing the other one of the stators.

4. A linear motor according to claim 3, wherein
   each of the two permanent magnet groups consists of three pairs of a permanent magnet having S polarity on a side opposing the stator and a permanent magnet having N polarity on the side opposing the stator.

* * * * *